United States Patent [19]

Dousse

[11] Patent Number: 5,373,412

[45] Date of Patent: Dec. 13, 1994

[54] ELECTRONIC TRIP DEVICE COMPRISING COMMUNICATION MEANS

[75] Inventor: Gilles Dousse, La Buisse, France

[73] Assignee: Merlin Gerin, France

[21] Appl. No.: 945,069

[22] Filed: Sep. 15, 1992

[30] Foreign Application Priority Data

Sep. 26, 1991 [FR] France ................... 91 11977

[51] Int. Cl.⁵ .............................................. H02J 9/00
[52] U.S. Cl. ........................................ 361/93; 361/94; 361/64
[58] Field of Search ............. 361/93, 94, 71, 97, 361/74, 96, 64

[56] References Cited

U.S. PATENT DOCUMENTS 4,535,409 8/1985 Jindrick ................................ 361/71
5,162,664 11/1992 Haun .................................... 361/94

Primary Examiner—Marc S. Hoff
Assistant Examiner—S. Jackson
Attorney, Agent, or Firm—Parkhurst, Wendel & Rossi

[57] ABSTRACT

The communication circuit of the self-powered trip device is disabled by the trip device microprocessor when the values of the measured currents are lower than preset values. The microprocessor sends a bit, called the power saving bit, before disabling the communication circuit so as to inform a monitoring device connected to the trip device of the cause of the interruption of transmission from the trip device.

6 Claims, 1 Drawing Sheet

ELECTRONIC TRIP DEVICE COMPRISING COMMUNICATION MEANS

BACKGROUND OF THE INVENTION

The invention relates to an electronic trip device performing protection functions and various ancillary functions, comprising means for measuring the current flowing in one or more conductors of a power supply system to be monitored, a self-powered supply connected to the measuring means, and a processing unit comprising communication means designed to transmit information to a monitoring device, means for comparing the current with preset values and disabling means to disable predetermined ancillary functions when the current is lower than said values so as to achieve a power saving in the trip device.

The object of the present invention is to improve a trip device of this type to enable it to be monitored remotely.

SUMMARY OF THE INVENTION

The trip device according to the invention is characterized in that, when the current is lower than said preset values, the disabling means monitor sending by the communication means of a power saving bit before disabling the communication means.

Sending of a power saving bit before disabling the communication means enables the monitoring device not to interpret in the same way a failure of the trip device or of the transmission circuit and a voluntary disabling of the communication means when the current is very low.

According to a development of the invention, the communication means periodically send a 4-bit byte comprising the power saving bit and supplying predetermined information to the monitoring device.

BRIEF DESCRIPTION OF THE DRAWINGS

Other advantages and features will become more clearly apparent from the following description of an illustrative embodiment of the invention, given as a non-restrictive example only and represented in the accompanying drawing in which the single FIGURE represents a block diagram of a trip device in which the invention is implemented.

DESCRIPTION OF THE PREFERRED EMBODIMENT

Figure 1:
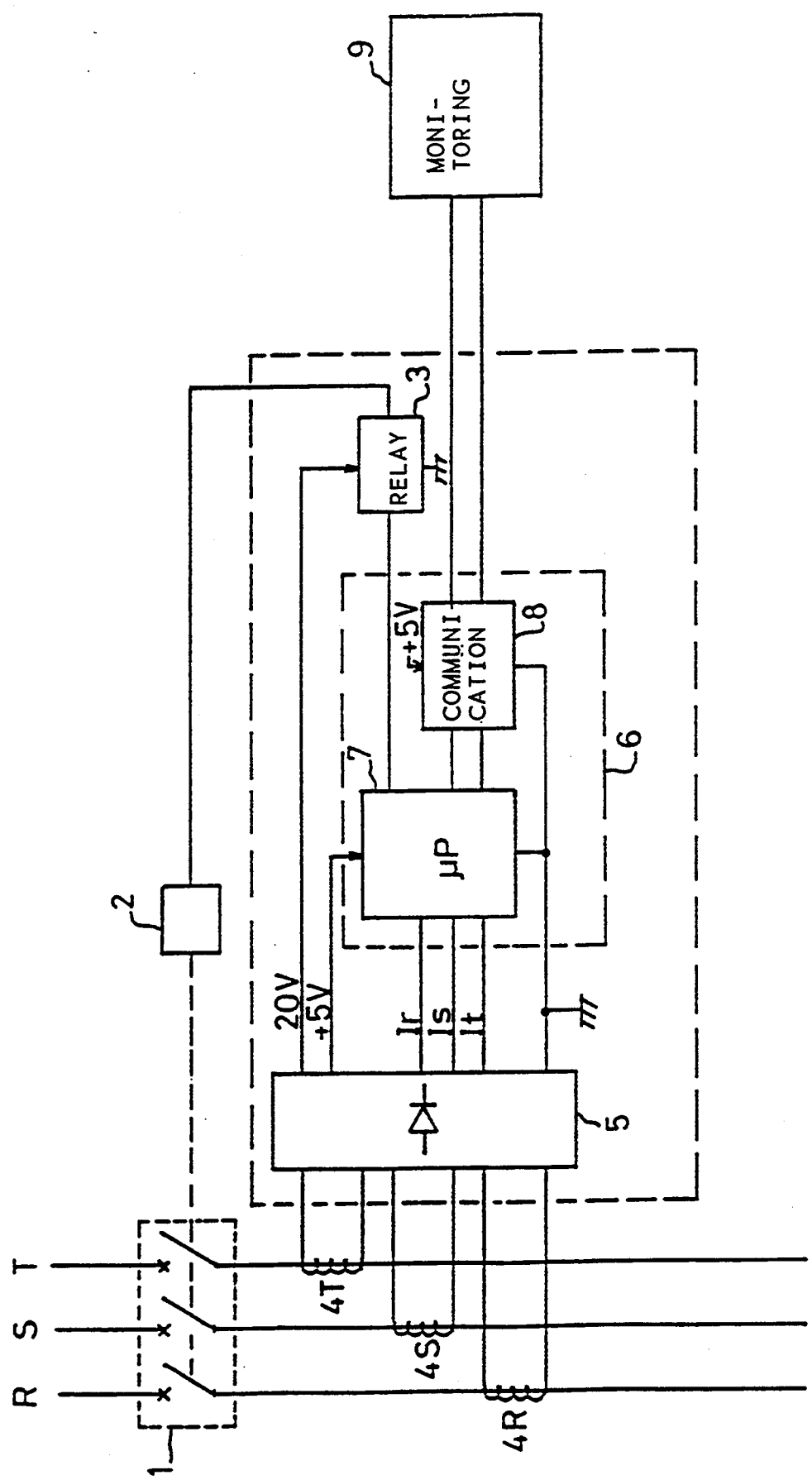

In the FIGURE, a circuit breaker 1 protecting lines R,S and T of a three-phase A.C. power supply system is actuated by an operating mechanism 2 controlled by a polarized relay 3 so as to bring about tripping of the circuit breaker in the event of an overload, short-circuit or earth fault.

The current intensity in each line is detected by a current transformer 4R,4S or 4T. The secondary windings of the current transformers are connected to a detecting and rectifying circuit 5 which supplies an electronic processing unit 6 of the trip device with signals Ir,Is,It, representative of the phase currents and also with a supply voltage (5 V) in the case of a self-powered trip device. The circuit 5 also supplies a supply voltage (20 V in the FIGURE) to the relay 3. The electronic processing unit 6 performs, in state-of-the-art manner, the long delay, short delay and instantaneous tripping functions so as to generate a circuit breaker tripping order when preset thresholds are exceeded. The tripping order thus produced is applied to the polarized relay 3 in order to actuate the circuit breaker.

Processing units of this kind are well-known, whether they be of the analog type or of the microprocessor-based digital type.

The electronic processing unit 6 also performs various ancillary functions. To give a non-restrictive example, such functions can include display, fault type indication, and load-shedding functions (not represented), etc.

In the FIGURE only the components of the processing unit 6 necessary for understanding the invention have been represented, i.e. a microprocessor 7 and communication circuit 8. Both are supplied (5 V) by the power supply circuit of the circuit 5. The microprocessor supplies the communication circuit with information to be transmitted to an external monitoring device 9. The communication circuit periodically transmits to the monitoring device 9, for example every few milliseconds, a certain number of items of information, considered as essential, for example in the form of a 4-bit byte. As an example these items of information are notably representative of the pretripping state of the trip device. In a preferred embodiment one 4-bit byte out of two contains this information.

In the event of a fault in the power supply system to be monitored, the microprocessor supplies a fault indication (pretripping state) to the communication circuit 8, which transmits it to the monitoring device 9. After tripping, the self-powered supply disappears and transmission of information to the monitoring device 9 is interrupted. The monitoring device 9 can therefore make the distinction between an interruption of the communication due to a tripping order by the trip device and an interruption of the communication due to other reasons, no pretripping bit then being transmitted with the last 4-bit bytes.

For a self-powered trip device, when the current in the power supply system is very low, the power supply can become insufficient. It has already been proposed to disable certain ancillary functions, which are large power consumers, such as display, when the current is lower than certain preset values, thus achieving a power saving. Only the essential functions of the trip device, the protection functions, are then maintained. In the trip device represented, the communication function is disabled when the sum of the currents in the different phases is lower than 0.44 In, In being the rated current of the circuit breaker. In a preferred embodiment, the communication circuit 8 operates as soon as one of the phase currents (Ir,Is or It) is greater than 0.44 In, or as soon as two of the phase currents are greater than 0.22 In, or when one of the phase currents being greater than 0.22 In, the other two are greater than 0.11 In.

In the absence of a specific measure, the monitoring device 9 cannot make the distinction between a voluntary interruption of communication corresponding to a power saving in the trip device and an interruption due to a failure of the trip device or transmission circuit. To enable it to make such a distinction a power saving bit is sent by the microprocessor and transmitted by the communication circuit with the 4-bit byte containing the essential information before the microprocessor disables the communication circuit and possibly other predetermined ancillary functions. This power saving bit preferably constitutes one of the 4 bits of this 4-bit byte. If communication is interrupted whereas the last 4-bit bytes include neither a pretripping bit nor a power saving bit, the monitoring device 9 interprets it as a failure of the trip device or of the transmission circuit unless an information, transmitted via other channels, indicates to it that the power supply system has been opened by another circuit breaker, or possibly that the circuit breaker has been opened manually.

Naturally, the invention is not limited to a three-pole circuit breaker, but applies just as well to a single-pole or multipole circuit breaker.

I claim:

1. An electronic trip device for performing protection functions and various ancillary functions, comprising: means for measuring the current flowing in one or more conductors of a power supply system to be monitored, a self-powered supply connected to the measuring means, a processing unit comprising communication means designed to transmit information to a monitoring device, and means for comparing the current with preset values and disabling means to disable predetermined ancillary functions when the current is lower than said values so as to save power in the trip device, wherein, when the current is lower than said preset values, the disabling means sends a power saving bit to the monitoring device before disabling the communication means.

2. The trip device according to claim 1, wherein the communication means periodically sends a 4-bit byte including the power saving bit and bits representative of other predetermined information to the monitoring device.

3. The trip device according to claim 1, wherein said predetermined ancillary functions are disabled when the sum of the currents flowing in the power supply system conductors is lower than a preset value.

4. The trip device according to claim 1, wherein the comparison and disabling means comprise a microprocessor which also performs the protection functions.

5. The trip device according to claim 1, further comprising tripping means for causing an interruption in the current flowing in the conductors in response to a tripping order received from the processing unit, wherein the processing unit generates the tripping order when the current exceeds preset thresholds.

6. The trip device according to claim 1, wherein the protection functions of the electronic trip device are maintained after the communication means is disabled.

* * * * *